United States Patent [19]

Ohshima et al.

[11] Patent Number: 5,599,765
[45] Date of Patent: Feb. 4, 1997

[54] CARD AND PROCESS FOR PRODUCING THE SAME

[75] Inventors: Katsuyuki Ohshima; Mineo Yamauchi; Masaki Kutsukake, all of Tokyo-to, Japan

[73] Assignee: Dai Nippon Insatsu Kabushiki Kaisha, Japan

[21] Appl. No.: 54,756

[22] Filed: Apr. 28, 1993

Related U.S. Application Data

[63] Continuation of Ser. No. 655,117, Feb. 14, 1991, abandoned.

[30] Foreign Application Priority Data

Feb. 16, 1990 [JP] Japan ................... 2-35948

[51] Int. Cl.⁶ .................... B41M 5/035; B41M 5/38
[52] U.S. Cl. .................. 503/227; 156/235; 428/195; 428/913; 428/914
[58] Field of Search ................ 8/471; 428/195, 428/204, 913, 914; 503/227; 156/235

[56] References Cited

U.S. PATENT DOCUMENTS

| | | | |
|---|---|---|---|
| 4,713,365 | 12/1987 | Harrison | 503/227 |
| 4,738,949 | 4/1988 | Sethi et al. | 503/227 |
| 4,740,496 | 4/1988 | Vanier | 503/227 |
| 4,923,848 | 5/1990 | Akada | 503/227 |
| 4,968,659 | 11/1990 | Nishitani et al. | 503/227 |
| 4,971,950 | 11/1990 | Kato et al. | 503/227 |
| 5,006,502 | 4/1991 | Fujimura et al. | 503/227 |
| 5,110,788 | 5/1992 | Katayama et al. | 503/227 |
| 5,217,942 | 6/1993 | Oshima et al. | 503/227 |

FOREIGN PATENT DOCUMENTS 0234563 9/1987 European Pat. Off. ......... 503/227
1-52477 9/1986 Japan ......................... 503/227

Primary Examiner—B. Hamilton Hess
Attorney, Agent, or Firm—Ladas & Parry

[57] ABSTRACT

A process for producing a card comprising:
  recording variable data comprising photographic data on at least one selected from a surface of a center core to be used for the card, and a back surface of an oversheet in a sheet form supplied from a roll thereof, by variable data recording means comprising a sublimation type thermal transfer device which uses a thermal transfer sheet having a dye layer imparted with a releasability,
  superposing the center core and the oversheet to form an integral laminate;
  cutting the integral laminate into a card form having a predetermined size.

The present invention also provides a process for producing a card comprising:
  recording variable data comprising photographic data on at least a surface of a center core to be used for the card by variable data recording means comprising a sublimation type thermal transfer device which uses a thermal transfer sheet having an image-receiving layer;
  superposing the center core and an oversheet in a sheet form supplied form a roll thereof to form an integral laminate; and
  cutting the integral laminate into a card form having a predetermined size.

According to the present invention, the recording of variable data including photographic data may be automated and simplified, thereby to improve the productivity. Further, the thus produced card according to the present invention is excellent in durability since the recorded surface thereof is covered with an oversheet.

4 Claims, 8 Drawing Sheets

CARD AND PROCESS FOR PRODUCING THE SAME

This is a continuation of application Ser. No. 07/655,117 filed on Feb. 14, 1991, now abandoned.

FIELD OF THE INVENTION AND RELATED ART

The present invention relates to a card such as an ID card, a credit card and a cash card, and to a process for producing said cards.

Hitherto, there have been known various cards such as magnetic card, IC card, and optical card which comprise a center core comprising a resin such as vinyl chloride, and an overshoot disposed on the surface thereof comprising a transparent resin sheet.

These cards are generally produced in the following manner.

First, a center core comprising a white resin plate having a thickness of about 0.5 mm is provided and (or common) data, pattern, etc., required for such a card are printed on the surface thereof by offset printing, screen printing, etc. Then, oversheets comprising thin transparent resin sheets are temporarily bonded to both surfaces of the center core, the entirety of the resultant laminate is subjected to hot pressing to be converted into an integral-type laminate, and cut or punched into a card form having a predetermined size. Thereafter, letters, marks, etc. required for individual cards are provided to the resultant cards by embossing by means of an embossing encoder, and/or such letters and marks are written on a magnetic stripe, whereby product cards are obtained.

Recently, photographs such as facial photograph have been bonded to the card of this type in some cases. In such a case, a photograph is bonded to a predetermined portions of the printed center core having a facial photograph size with hands of operator, and then an oversheet is laminated on the resultant product.

As the cards having a facial photograph, (Japanese Laid-Open Patent Application (JP-A, KOKAI) No. 120696/1988) Japanese Laid-Open Patent Application No. 293383/1989 has proposed a card having a transparent sheet bonded to the surface thereof wherein data such as facial photograph is recorded in the transparent sheet in advance; Japanese Laid-Open Patent Application No. 220395/1987 has proposed a card having an image-receiving layer formed thereon wherein data such as facial photograph is recorded by thermal transfer recording; Japanese Laid-Open Patent Application No. 22693/1988 has proposed a card having an image-receiving layer formed thereon wherein data such as facial photograph is recorded by sublimation transfer recording, and thereafter an overshoot is bonded to the image-receiving layer; etc.

However, in the production method disclosed in Japanese Laid-Open Patent Application No. 120696/1988, since manual operation for bonding the photograph is required, the resultant productivity is low and an error in the bonding of the photograph is liable to occur.

In the card disclosed in the Japanese Laid-Open Patent Application Nos. 293383/1989 and 220395/1987, there occurs a problem in the durability of the data such as the facial photograph recorded in the surface of the card or transparent sheet.

Further, in the card disclosed in Japanese Laid-Open Patent Application No. 22693/1988, a step of forming the image-receiving sheet on the surface of the card is newly required and therefore the resultant production cost is increased.

SUMMARY OF THE INVENTION

A principal object of the present invention is, in view of the above-mentioned problems encountered in the prior art, to a process for producing a card which is capable of producing a card having photographic data, etc., recorded thereon without manual operation such as bonding of a photograph while attaining a high productivity.

Another object of the present invention is to provide a card which surely retains photographic data, etc., and is excellent in durability.

As a result of our investigations for solving the above-mentioned problems, we have found that photographic data may be recorded in a center core or an oversheet constituting a card by a variable data recording means such as thermal transfer-type printer which is capable of recording variable data including photographic data, whereby we have reached the present invention.

According to a first aspect of the present invention, there is provided a process for producing a card comprising:

recording variable data comprising photographic data on at least one selected from a surface of a center core to be used for the card, and a back surface of an oversheet in a sheet from supplied from a roll thereof, by variable data recording means comprising a sublimation type thermal transfer device which uses a thermal transfer sheet having a dye layer imparted with a releasability;

superposing the center core and the oversheet to form an integral laminate; and cutting the integral laminate into a card form having a predetermined size.

According to a second aspect of the present invention, there is provided a process for producing a card comprising:

recording variable data comprising photographic data on at least a surface of a center core to be used for the card by variable data recording means comprising a sublimation type thermal transfer device which uses a thermal transfer sheet having an image-receiving layer;

superposing the center core and an oversheet in a sheet from supplied from a roll thereof to form an integral laminate; and cutting the integral laminate into a card form having a predetermined size.

According to a third aspect of the present invention, there is provided a card comprising a center core and an oversheet disposed on at least one surface of the center core, the card having a recorded portion on at least one selected from a surface of the center core and a back surface of the oversheet; wherein the recorded portion has variable data comprising photographic data recorded by variable data recording means comprising a sublimation type thermal transfer device which uses a thermal transfer sheet having a dye layer imparted with a releasability.

According to a fourth aspect of the present invention, there is provided a card comprising a center core and an oversheet disposed on at least one surface of the center core, the card having: an image-receiving layer which has been formed on the surface of the center core by means of a sublimation type thermal transfer device using a thermal transfer material having an image-receiving layer; and having a recorded portion on at least the surface of the center core; wherein the recorded portion has variable data comprising photographic data recorded by variable data recording means comprising the sublimation type thermal transfer device using the thermal transfer sheet.

According to the present invention, the recording of variable data including photographic data may be automated and simplified, thereby to improve the productivity. Further, the thus produced card according to the present invention is excellent in durability since the recorded surface thereof is covered with an oversheet.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1(A, B) is a schematic sectional view showing an embodiment of the card according to the present invention wherein

FIGS. 2(A, B) is a schematic sectional view showing another embodiment of the card according to the present invention wherein

FIGS. 3(A, B) is a schematic sectional view showing a still another embodiment of the card according to the present invention wherein

FIGS. 7(A, B, C) is a schematic view for illustrating an embodiment of the method of hot-pressing a temporarily bonded laminate, wherein

DESCRIPTION OF PREFERRED EMBODIMENTS

Hereinbelow, a preferred embodiment of the present invention is specifically described with reference to accompanying drawings.

Figure 1A:
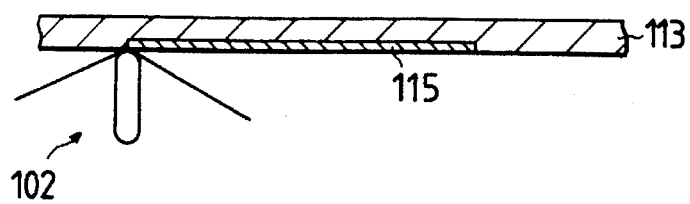
FIG. 1(A) shows a state of recording variable data including photographic data in an oversheet.
Figure 1B:
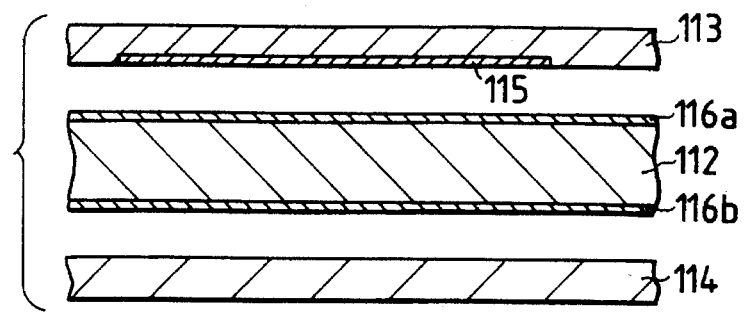
FIG. 1(B) shows a state of a center core and an oversheet before these members are temporarily bonded to each other.

FIG. 1 is a schematic sectional view showng an embodiment of the card according to the present invention wherein FIG. 1(A) shows a state of recording variable data including photographic data in an oversheet; and FIG. 1(B) shows a state of a center core and an oversheet before these members are temporarily bonded to each other.

Referring to FIG. 1, variable data 115 including photographic data is recorded in an oversheet 113 by a variable data recording means 102. On the other hand, a center core 112 has been subjected to a predetermined printing operation, in advance, whereby ink layers 116a and 116b are formed. Then, a card according to this embodiment is produced by temporarily bonding an oversheet 113 and an oversheet 114 to the center core 112 prepared above, subjecting the resultant laminate to hot-pressing, and cutting into a card form having a predetermined size. The thus produced card is one having the variable data including the photographic data on the back side of the oversheet 113.

Figure 2A:
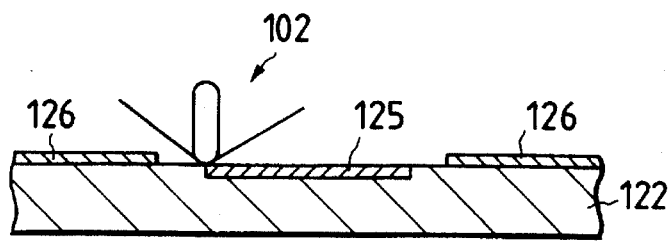
FIG. 2(A) shows a state of recording variable data including photographic data in an oversheet.
Figure 2B:
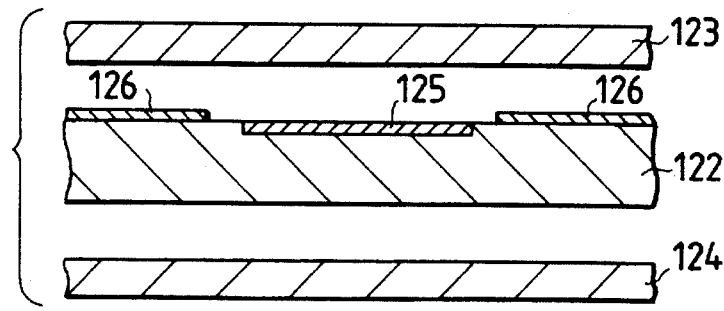
FIG. 2(B) shows a state of a center core and an oversheet before these members are temporarily bonded to each other.

FIG. 2 is a schematic sectional view showing another embodiment of the card according to the present invention wherein FIG. 2(A) shows a state of recording variable data including photographic data in a center core; and FIG. 2(B) shows a state of a center core and an oversheet before these members are temporarily bonded to each other.

Referring to FIG. 2, variable data 125 including photographic data is recorded in a predetermined region of a center core 122 other than the region which has been subjected to a predetermined printing operation, in advance, so as to form an ink layer 126, by a variable data recording means 102. Then, a card according to this embodiment is produced by temporarily bonding an oversheet 123 and an oversheet 124 to the center core 122 prepared above, subjecting the resultant laminate to hot-pressing, and cutting into a card form having a predetermined size. The thus produced card is one having the variable data including the photographic data on the surface side of the center core.

In the present invention, the center core and the oversheet constituting the card are required to have a card adaptability and a bonding property. These members are also required to have a printing or lettering property in a case where they are subjected to image recording and/or printing operation. Further, the oversheet is required to have a property of protecting an image against light, heat, etc. Accordingly, as the material of the center core and oversheet, one having the above-mentioned characteristics is selected.

Such a material may be any of those known in the art which have a heat resistance and a strength to a certain extent. Specific examples thereof may include; paper, various coated paper, polyester film, polystyrene film, polypropylene film, polysulfone film, aramid film, polycarbonate film, polyvinyl alcohol film, polyvinyl chloride film, ABS film, cellophane, etc. Among these, polyvinyl chloride film is particularly preferred.

If the above-mentioned substrate film has a poor adhesive property with respect to a dye layer to be formed on the surface thereof, it is preferred to subject the substrate film to an adhesive property imparting treatment such as primer treatment and corona discharge treatment. Further, it is also possible to add an ultraviolet light absorbing agent, and antioxidizing agent, and a heat stabilizer to the oversheet.

The oversheet may preferably have a thickness of about 0.01 to 0.2 mm, and the center core may preferably have a thickness of about 0.1 to 0.7 mm. The oversheet and center core may comprise a single layer or a laminate comprising two or more layers. In a case where the center core comprises a laminate comprising a plurality of sheets, each sheet may have a smaller thickness and may be provided in the form of a roll. As a result, the card according to the present invention may constituting be produced in such a case, as in Examples appearing hereinafter. It is preferred to disposed the oversheet on both sides of the center core. However, it is possible to dispose the oversheet on one side of the center core.

When variable data including photographic data is recorded in the center core or oversheet, such a member may be in the form of sheets, or in the form of a continuous sheet. In a case where the center core has a laminate structure, it is possible to record the variable data for the center core on a sheet constituting the center core before the laminating thereof.

As the means for recording variable data including photographic data, it is possible to use one comprising a thermal transfer type printer or an ink jet type printer. It is particularly preferred to use a sublimation type thermal transfer printer, since such a printer may provide a beautiful image at a relatively low cost. The thermal transfer type printer may be either of a flat type or a platen type, which may appropriately be selected depending on the form of the center core or oversheet to be recorded. Further, the thermal transfer printer may be either of one-head type or multi-head type.

In the present invention, the contents of the recording provided by the variable data recording means comprise at least photographic data such as facial photograph. However, the contents of the recording may also comprise variable character data such as name, address, and number. Further, the variable data may also comprise data common to the card such as explanation and design. When the above-mentioned various data is recorded, all data is not necessarily recorded by using a common printer, but printers of differed type may be used as desired. For example, it is possible that the photographic data is recorded by means of a sublimation type thermal transfer printer, and character data is recorded by means of a melting type thermal transfer printer.

The thermal transfer sheet to be used in combination with the sublimation type thermal transfer printer may preferably be one having a dye layer having a releasability. In order to impart a releasability to the dye layer, it is possible to add to the interior of the dye layer a release agent comprising a graft copolymer containing a releasing segment, or to use as a binder resin for the dye layer comprising a graft copolymer containing a releasing segment.

The graft copolymer containing a releasing segment used herein may be a graft copolymer having at least one releasing segment selected from a polysiloxane segment, a fluorinated carbon segment and a long-chain alkyl segment grafted on a main chain.

As the polymer constituting the main chain, it is possible to use any of polymers known in the art having a reactive functional group. Preferred examples thereof may include; cellulose type resins such as ethyl cellulose, hydroxyethyl cellulose, ethyl hydroxy cellulose hydroxypropyl cellulose, methyl cellulose, cellulose diacetate, cellulose triacetate and cellulose acetatebutyrate, vinyl type resins such as acrylic resin, polyvinyl alcohol, polyvinyl acetate, polyvinyl butyral, polyvinyl acetal, polyvinyl acetoacetal, polyvinyl pyrrolidone, and polyacrylamide; polyamide resin, polyurethane resin, polyester resin, etc. Among these, it is particularly preferred to use acrylic type resin, vinyl type resin, polyester type resin, polyurethane type resin, polyamide type resin, or cellulose type resin in view of the compatibility with the binder.

The above-mentioned releasing copolymer may be synthesized in various manners. Preferred examples thereof may include a method wherein a main chain is formed, and thereafter the functional group contained in the resultant main chain is reacted with a releasing compound having a functional group capable of reacting with that contained in the main chain. Specific example of such a releasing copolymer may include a silicon graft copolymer synthesized in a manner wherein a siloxane main chain containing a functional group in one end portion of the main chain is reacted with a dimethyl isocyanate, and thereafter the resultant is reacted with a polyvinyl acetoacetal containing a OH group.

In the present invention, the dye to be used for the thermal transfer sheet as described above is not particularly restricted and can be any of dyes which have been used in the conventional thermal transfer sheet.

Specific examples of such a dye may include; red dyes such as MS Red G, Macrolex Red Violet R, Ceres Red 7B, Samaron Red HBSL, and Resolin F3BS, yellow dyes such as Horon Brilliant Yellow 6GL, PTY-52, and Macrolex Yellow 6G; blue dyes such as Kayaset Blue 714, Wacsorine Blue AP-FW, Horon Brilliant Blue S-R, and MS Blue 100.

Further, Waxes such as polyethylene wax, an organic filler, and an inorganic filler may be added to the dye for improving a printing property and a antithermalexpansion property against an image receiving sheet.

In the present invention, data common to the card such as explanation and design is not necessary be recorded by using the variable data recording means, but such data may also be recorded in the center core or oversheet by offset printing or screen printing.

Figure 3A:
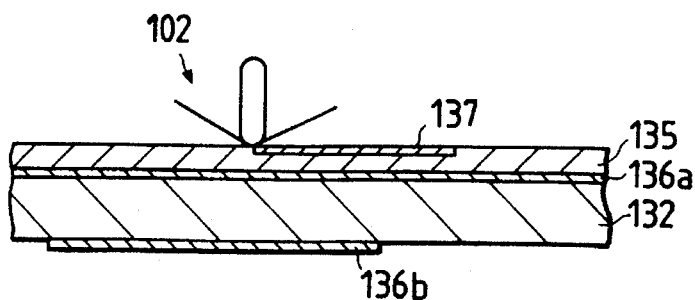
FIG. 3(A) shows a state of recording variable data including photographic data in an oversheet.
Figure 3B:
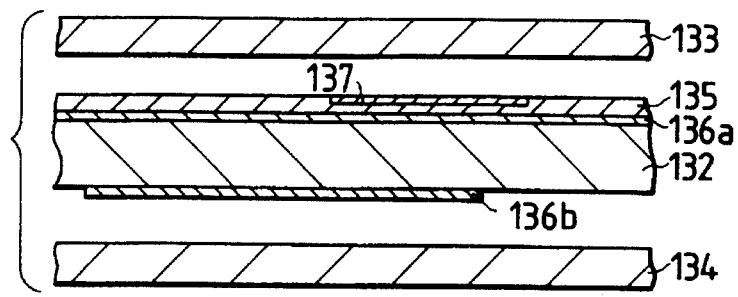
FIG. 3(B) shows a state of a center core and an oversheet before these members are temporarily bonded to each other.

FIG. 3 is a schematic sectional view showing another embodiment of the card according to the present invention wherein FIG. 3(A) shows a state of recording variable data including photographic data in a center core; and FIG. 3(B) shows a state of the center core and an oversheet before these members are temporarily bonded to each other.

Referring to FIG. 3, an image receiving layer 135 is formed on the center core 132 which has been subjected to a predetermined printing operation, in advance, so as to form an ink layers 136a and 136b by a variable data recording means 102.

Then, variable data including photographic data is similarly recorded on the image receiving layer 135 by the variable data recording means 102. Thereafter, a card according to this embodiment is produced by temporarily bonding an oversheet 133 and an oversheet 134 to the center core 132 prepared above, subjecting the resultant laminate to hot-pressing, and cutting into a card form having a predetermined size. The thus produced card is one having the variable data including the photographic data on the surface of the center core. In such a card, since the image receiving layer is formed prior to the recording of the variable data including photographic data, recording is effected on the ink layer formed on the center core, such printing on the image receiving layer can be effected by using a thermal transfer sheet comprising an image receiving layer and a dye layer as shown in FIG. 4(A) by means of a sublimation type thermal transfer printer.

Figure 4A:
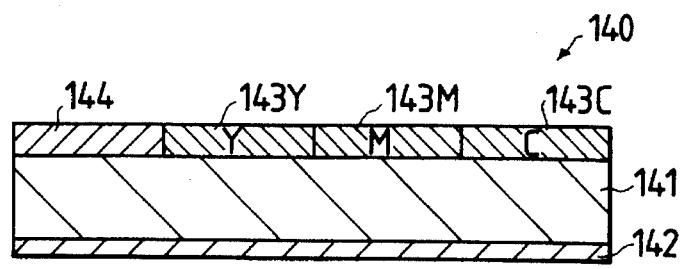
FIG. 4(A) is a schematic sectional view showing an embodiment of a thermal transfer sheet to be used in the present invention.

Referring to FIG. 4(A), a thermal transfer sheet 140 comprises a substrate 141, a heat-resistant lubricating layer 142 formed on one side of the substrate 141, and dye layers 143Y, 143M and 143C and an image receiving layer 144 formed on the other side of the substrate 141. As a substrate film for the thermal transfer sheet 140, it is possible to use any of films known in the art having a certain property of heat resistance and strength. Specific examples thereof may include; paper, various coated paper, polyester film, polystyrene film, polypropylene film, polysulfone film, aramid film, polycarbonate film, etc. Among these, polyester film is particularly preferred.

The substrate film may preferably have a thickness of about 0.5 to 50 μm, more preferably about 3 to 10 μm. It is preferred to subject the surface of the substrate film to an adhesive property imparting treatment.

The image receiving layer 144 comprises a resin having a dyeing property. Specific examples thereof may include; vinyl chloride-vinyl acetate copolymer, polyester resin, epoxy resin, vinyl chloride resin, vinyl acetate resin, styrene resin, etc. Further, it is preferred to add a releasing agent to the above resin for imparting a thermal-releasing property to the image receiving layer 144. Specific examples of such a releasing agent may include; silicone oil, phosphate surfactant, fluorine surfactant, etc. Among these, silicone oil is particularly preferred. Specific examples of such a silicone oil may include; modified silicone oils such as epoxy modified silicone oil, alkyl modified silicone oil, amino modified silicone oil, carboxyl modified silicone oil, alcohol modified silicone oil, fluorine modified silicone oil, alkyl-alkyl polyether modified silicone oil, epoxy polyether modified silicone oil, polyether modified silicone oil, etc.

Figure 4B:
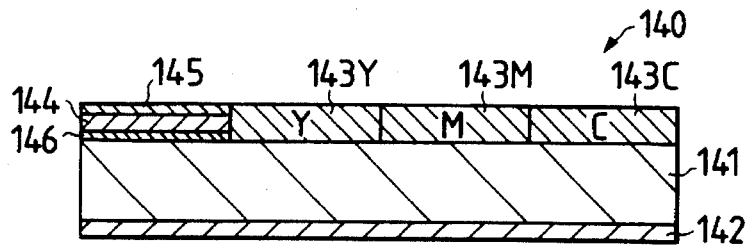
FIG. 4(B) is a schematic sectional view showing another embodiment of a thermal transfer sheet to be used in the present invention.

The above-mentioned releasing agent may be used with an amount of 0.5 to 30 wt. parts per 100 wt. parts of the resin constituting the image receiving layer 144 so that a releasing layer is formed on the surface of the image receiving layer by bleeding out of the releasing agent when the image receiving layer is transferred. If the addition amount is below the above-mentioned range, a melt adhesion between the thermal transfer sheet and the image receiving layer may occur and a printing sensitivity may be insufficient. Referring to FIG. 4(B), in order to obtain an adhesion property, a hiding property, a cushion property between the image receiving layer 144 and the center core, or between the ink layer and a transfer-receiving material, it is possible to form an adhesive layer 145 on the image receiving layer 144. Such an adhesive layer 145 may be formed by using acrylic resin, nylon resin, vinyl chloride-vinyl acetate copolymer, urethane resin etc.. In order to impart a detection property, a hiding property, a cushion property, an absorbency of an evenness of the center core, etc., it is possible to incorporate a fluorescent whitening dye, an antistatic agent, filter, a pigment, a foaming agent, etc., in the image receiving layer and adhesive layer. Further, it is also possible to dispose a releasing layer 146 between the image receiving layer 144 and the substrate 141. The releasing layer may be formed by using vinyl acetate resin, polyamide resin, polyester resin, polyurethane resin, cellulose resin, etc.

Specific example of the thermal transfer sheet 140 may comprise the substrate having a surface subjected to an adhesive property imparting treatment and a heat-resistant lubricating layer 142, a multi layer formed on a predetermined region of the substrate by gravure printing comprising a polyamide resin layer (a releasing layer 146), a vinyl chloride-vinyl acetate copolymer layer (an image receiving layer 144), an acrylic resin layer (an adhesive layer 145), and dye layers 143Y, 143M and 143C formed on a predetermined region of the substrate surface, respectively. In this case, an amino modified silicone oil with an amount of 5 wt. % and an epoxy modified silicone oil with an amount of 5 wt. % are added to the image receiving layer, respectively.

The dye layer 143Y, 143M and 143C may be formed by using the above-mentioned dye a resin binder, etc. A releasability is not necessarily imparted to the dye layer 143Y, 143M or 143C. The reason for this is that since printing is effected on the center core by the medium of the image receiving layer 144, good printed characters can be provided even in a case where a releasability is not imparted to the dye layer 143Y, 143M and 143C. It is also possible to dispose a black layer on the substrate 141 in addition to the dye layers 143Y, 143M and 143C and the image receiving layer 144.

In a case where printing is effected by using the above-mentioned integral type thermal transfer sheet having an image receiving layer one-head type printer may be used. In a case where a multi-head type printer is used, it is possible to use different thermal transfer materials respectively having an image receiving layer, a red dye layer, a yellow dye layer and a blue dye layer. Further, an alignment of a printer in transverse direction may be either of single-line type or multi-line type. In this case, a head of the printer has a length corresponding to a number of line. Further, in multi-line, each data is individually input to each thermal head and the thermal head individually outputs to record the variable data.

The above-mentioned image receiving layer 135 may be formed on the center core 132 by using transfer operation so as to cover the entire surface of the center core 132, or so as to cover a part thereof.

The center core and the oversheet are laminated and formed into a integral laminate after the variable data is recorded. Such integration may be effected by superposing the center core and the oversheet to form a laminate, temporarily bonding these members to each other, and subjecting the resultant laminate to hot pressing. In a case where a continuous sheet material which has been pulled out of a roll thereof is used as the center core and oversheet, it is possible that these sheet materials are laminated and, temporarily bonded to each other, the resultant laminate is cut into a predetermined form having an appropriate size, and the cut product is subjected to hot pressing; or the continuous laminate sheet without punching per se is subjected to hot pressing by using a hot roller method.

In this case, an alignment of a card in transverse direction and in longitudinal direction may be either of single-line or multi-line.

In order to bond the center core and the oversheet to each other to form an integral laminate, it is preferred to use an appropriate bonding agent or adhesive sheet. When such an agent or sheet is used, it is possible to reduce the hot pressing time or to lower the hot pressing temperature. The bonding agent or adhesive sheet is required to have properties such that it provide a strong adhesion force, it does not affect an image, it has an embossing adaptability, etc. More specifically, such an bonding agent or adhesive sheet may be one comprising vinyl chloride-vinyl acetate type resin, nylon resin, polyester resin, etc.

Prior to the laminating and integration of the oversheet and the center core, a predetermined member such as magnetic stripe, IC module, optical stripe may be disposed on a predetermined position of the center core or oversheet. Further, before or after the laminating and integration of the center core and the oversheet, a hologram and/or a hiding layer may also be transferred to at least one of the above-mentioned members, as desired.

After the center core and the oversheet are bonded to each other to form a integral laminate, the resultant laminate is punched into a card form having a predetermined size, and is subjected to embossing and desired writing by means of an embossing encoder.

According to the present invention, various cards such as magnetic card, IC card and optical card may be prepared by using the above-mentioned steps.

Hereinbelow, the process for producing a card according to the present invention is described in more detail with reference to the accompanying drawings.

Figure 5:
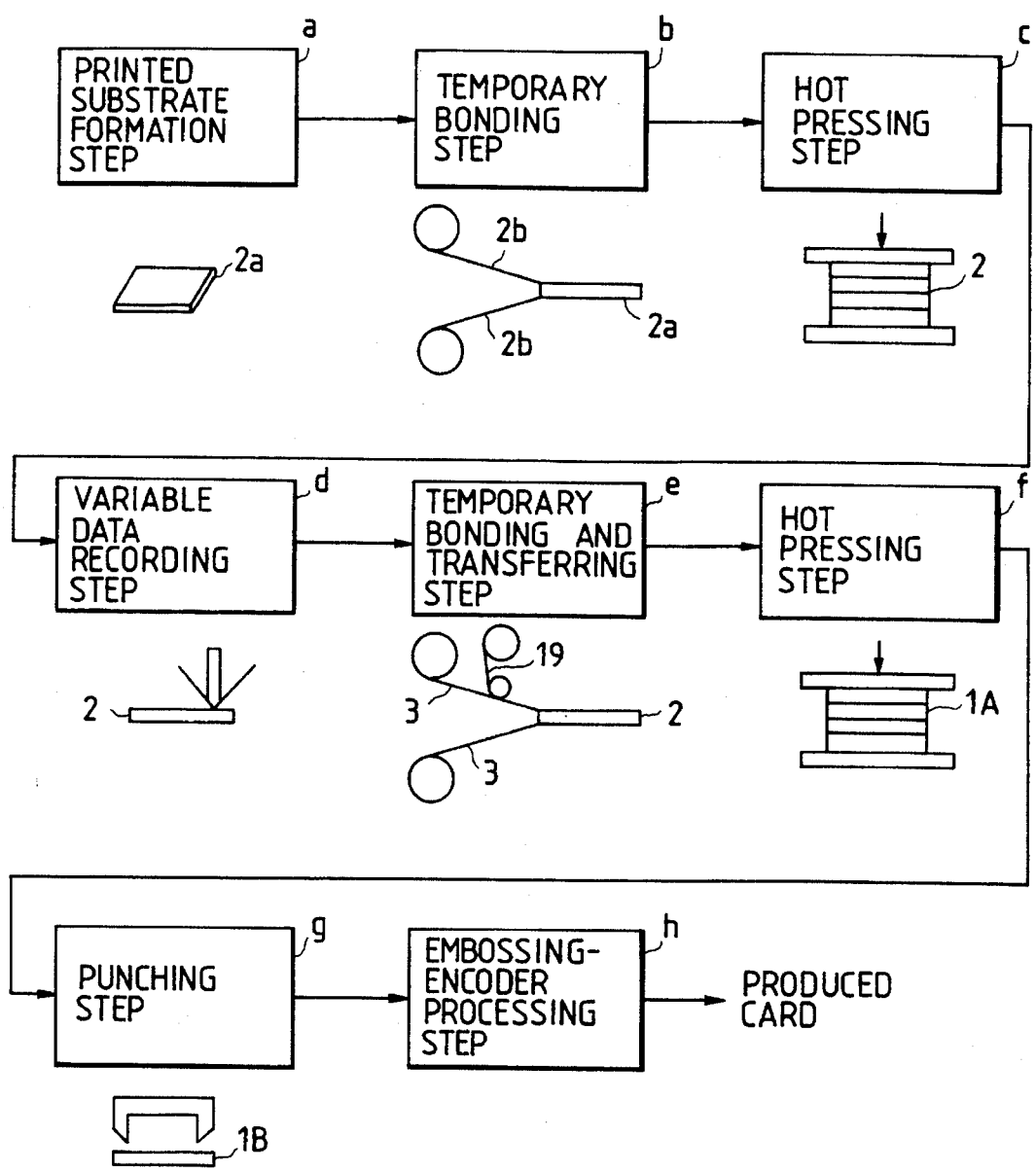
FIG. 5 is a schematic view for illustrating the process for producing a card according to an embodiment of the present invention.
Figure 8:
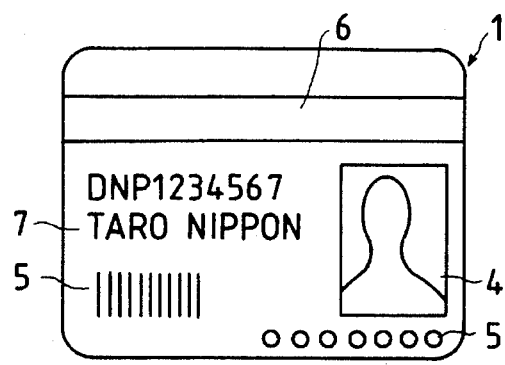
FIG. 8 is a schematic plan view of a magnetic card according to an embodiment of the present invention.
Figure 9:
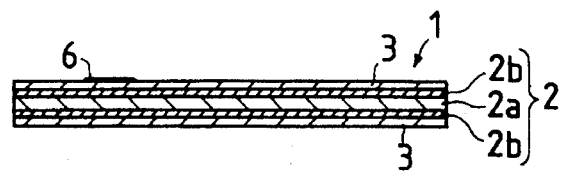
FIG. 9 is a schematic sectional view of the magnetic card shown in FIG. 8.

FIG. 5 is a schematic view showing a process for producing the card as shown in FIGS. 8 and 9 according to an embodiment of the present invention.

A magnetic card 1 shown in FIGS. 8 and 9 is one to be used for an ID card, and therefore such a card 1 is referred to as "ID card" hereinafter.

The ID card 1 is a type of card shown in FIG. 2, and comprises a laminate of a center core comprising polyvinyl chloride as a base material, and oversheets 3 disposed on both sides of the center core which comprise a thin polyvinyl chloride sheet. The center core 2 can comprise a single layer of a polyvinyl chloride sheet, but the center core 2 as shown in FIG. 8 and 9 is one comprising a polyvinyl chloride substrate 2a and thin polyvinyl chloride sheets 2b disposed on both sides of the substrate 2a. The center core 2 may a thickness of about 0.1 to 0.7 mm, and the oversheet may have a thickness of about 0.01 to 0.2 mm. In the ID card 1, variable data such as facial photograph 4, attribute data (car-code, address, name, etc.) 5 is recorded on the surface or back surface of the center core 2. Further, an image common to respective cards such as explanation and design is recorded on the surface of the substrate 2a constituting the center core 2. Further, in the ID card 1, a magnetic stripe 6 is provided, and an embossed character 7 such as name and number is formed.

Next, there is described a process for producing the ID card 1 having the above-mentioned structure according to the present invention with the reference to FIG. 5.

(a) Printed substrate formation step (FIG. 5, a)

First, a polyvinyl chloride sheet having a predetermined thickness is provided an image such as explanation and design is printed on the surface thereof by offset printing, screen printing, etc., and then the resultant printed sheet is cut or punched into a certain form having a predetermined size, whereby a printed substrate 2a is prepared.

(b) Temporary bonding step for polyvinyl chloride sheet (FIG. 5, b)

A polyvinyl chloride sheet is supplied from a roll thereof, temporarily bonded to both surfaces of the substrate 2a, and thereafter the resultant laminate is cut off.

(c) Hot pressing step (FIG. 5, c)

The laminate obtained by temporarily bonding the polyvinyl chloride sheets 2b to both surfaces of the substrate 2a is hot-pressed to bond the polyvinyl chloride sheet 2b to the substrate 2a, whereby a center core 2 in the form of a sheet is formed.

(d) Variable data recording step (FIG. 5, d)

Variable data such as facial photograph and attribute data is recorded on the surface of the center core by using a variable data recording means.

Figure 6:
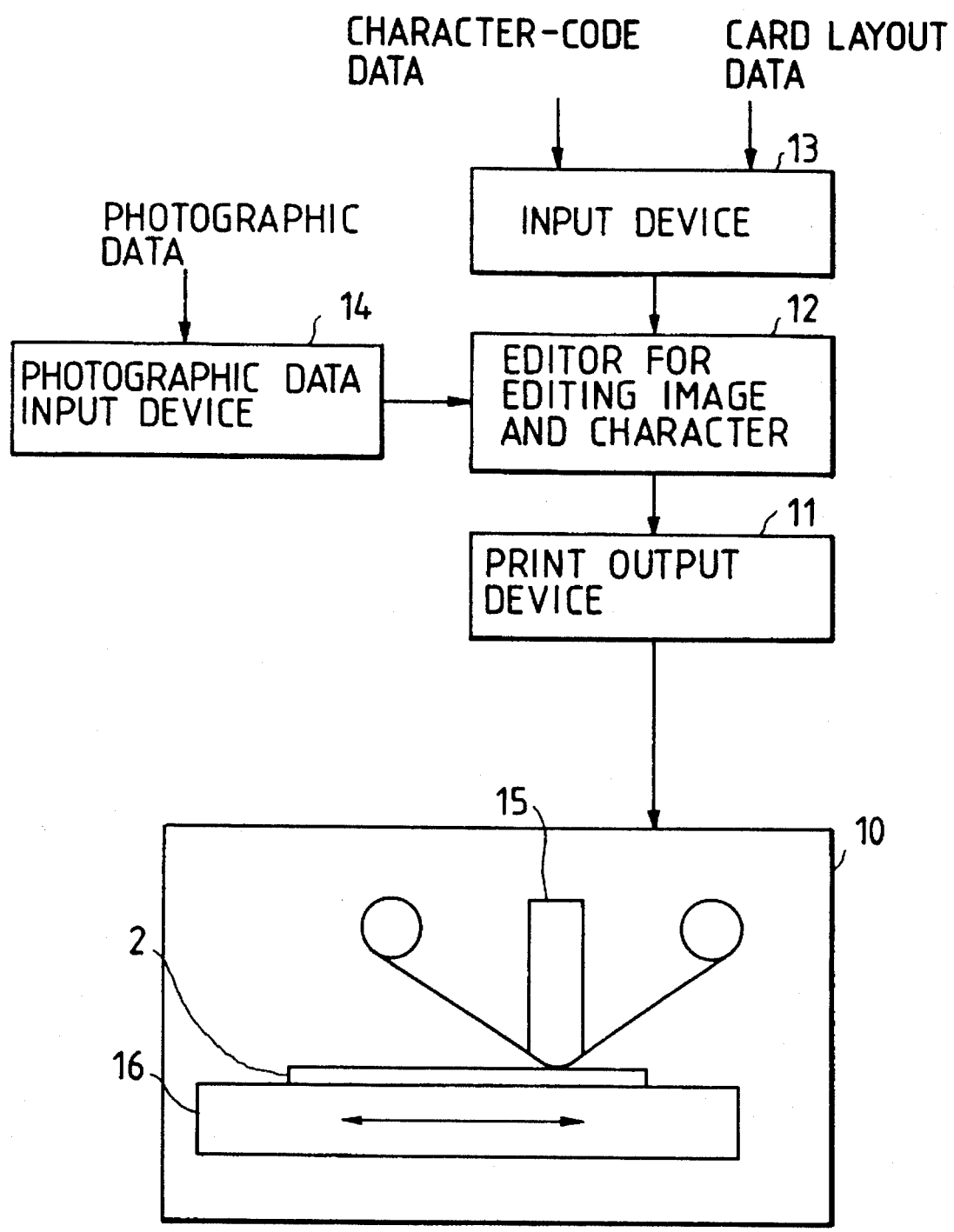
FIG. 6 is a block diagram for illustrating an embodiment of the variable data recording means to be used in the process for producing a card as shown in FIG. 5.

The variable data recording means used herein comprises a printer 10, a print output device 11, an editor 12 for editing image and character, an input device 13 for inputting card layout data and character-code data, and a photographic data input device (CCD camera, CCD scanner, etc.) 14, as shown in FIG. 6. In the variable data recording means, when an operator inputs variable data such as card layout data and character-code data by using the input device 13, and inputs variable data such as facial photograph by using the photographic data input device 14, the image character editor 12 lays out the variable data in a predetermined position, and the print output device controls the printer 10 so as to record the variable data on the surface of the center core.

The printer 10 can be a thermal transfer type, an ink-jet type, etc., but may preferably be a sublimation type thermal transfer printer, since such a printer is capable of easily providing good color images, as described hereinabove.

The sublimation type thermal transfer printer for effecting image recording on the center core 2 may preferably be one of a flat type as shown in FIG. 6, which comprises a center core mount 16 for supporting the center core 2 and reciprocating it with respect to a thermal head 15. The thermal head 15 for effecting recording on the center core 2 may be a one-head type as shown in FIG. 6 which has one thermal head element. However, the thermal head 15 may also be a multi-head type comprising a plurality of thermal head element corresponding to desired colors.

(e) Step for temporarily bonding oversheet and transferring magnetic stripe (FIG. 5, e)

Referring to FIG. 5, an oversheet 3 supplied from a roll of polyvinyl chloride sheet is temporarily bonded to both surfaces of the center core on which variable data such as facial photograph and attribute data has been recorded in the previous step, and the resultant laminate is cut off. Further, at this time, a magnetic stripe 1a is simultaneously transferred to the oversheet 3 on one side.

(f) Hot pressing step (FIG. 5, f)

The temporarily bonded product 1A obtained by temporarily bonding the oversheet 3 to the center core 2 in the previous step is hot-pressed to strongly bond the center core 2 and the oversheet 3 to each other.

Such hot pressing may be conducted in each of the following manners.

(i) Multi-step method

Figure 7A:
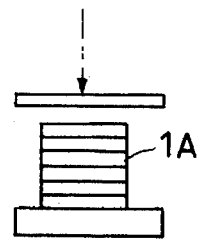
FIG. 7(A) is a side view showing a state wherein a plurality temporarily bonded laminates are superposed.

The temporarily bonded product 1A comprising the center core 2 and the oversheet 3 discharged from the apparatus corresponding to the previous step is automatically superposed by the medium of caul, comprising a metal plate, etc. When a predetermined number of the products 1A are superposed as shown in FIG. 7(A), the entirety of the superposed products are hot-pressed (temperature elevation-retaining-cooling).

(ii) Parallel method

Figure 7B:
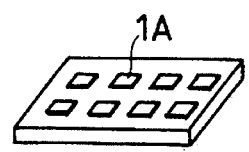
FIG. 7(B) is a perspective view showing a state wherein a plurality of temporarily bonded laminates are arranged.

A plurality of the temporarily bonded product sheets 1A discharged from the apparatus corresponding to the previous step are automatically disposed in parallel with each other as shown in FIG. 7(B), and the entirely of the products are hot-pressed.

(iii) Sole method

Figure 7C:
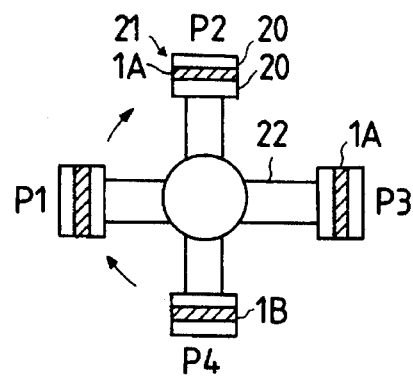
FIG. 7(C) is a plan view showing a turret for effecting hot-pressing.

In such a method, a turret as shown in FIG. 7(C) comprising a number of press portions 21 comprising a pair of press plates 20. The turret 22 is intermittently rotated in the direction indicated by the arrow. While the pressing portion 21 passes the position P1 to P4, the turret 22 receives the temporarily bonded product prepared in the previous step, and conducts heating, pressing, cooling and pressing by means of the pair of press plates 20 so as to form a laminate products 1B is comprising the center core 2 and oversheet 3 strongly bonded to each other. The resultant laminate product 1B is discharged to the apparatus corresponding to the next step.

(g) Punching step (FIG. 5, g)

Referring to FIG. 5, the laminate 1B formed by hot pressing is punched into a card form having a predetermined size, from which unnecessary margin portion is removed.

(h) Embossing-encoder processing step (FIG. 5, h)

The card formed in the previous step is subjected to embossing-encoder so as to form an embossing character such as name and number as shown in FIG. 8.

As a result, the ID card as shown in FIG. 8 is produced through the above-mentioned steps.

In the present invention, in order to practice the above-mentioned process for producing a card, there may be used some apparatus for respectively practicing the steps thereof. At this time, it is possible to dispose an automatic conveying device between the respective apparatus so that a semi-finished product prepared in the previous step is automatically conveyed to the apparatus corresponding to the next step. It is also possible to manually convey such a semi-finished product.

In a case where a hologram or a hiding layer is transferred to the card, the step for transferring such a hologram or hiding layer may be positioned before or after the step for bonding the center core and the oversheet to each other.

In the above-mentioned embodiment, the variable data such as facial photograph is recorded on the surface of the center core. However, it is also possible to record the variable data on back surface of the center core of the card of the type as shown in FIG. 1, both of the surface and back surface of the center core, or the back surface of the oversheet.

When the thermal transfer material 140 as shown in FIG. 4 is used, printing may be effected on printing ink. Accordingly, the printed substrate 2a may be used as a center core without bonding as polyvinyl chloride sheet 2b. In such a case, the step for temporarily bonding the polyvinyl chloride sheet (FIG. 5, b) and hot pressing step (FIG. 5, c) may be omitted.

Figure 10:
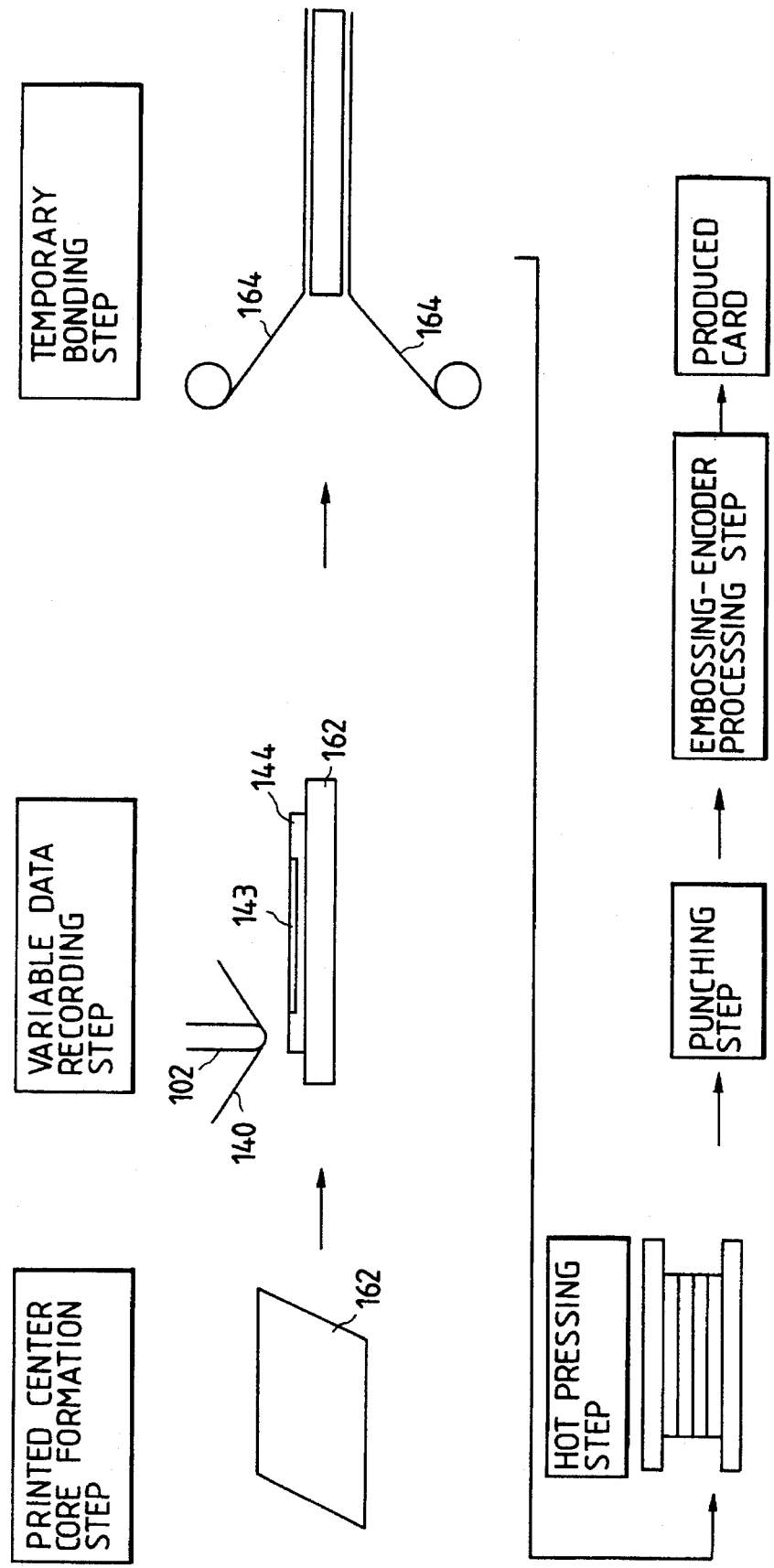
FIG. 10 is a schematic view for illustrating the process for producing a card according to another embodiment of the present invention.

For example, referring to FIG. 10, when thermal transfer sheet 140 as shown in FIG. 4 is used, the image receiving layer 144, and dye layers 143Y, 143M and 143C formed on the substrate 141 are transferred to a printed center core 162 so as to record the variable data to the center core 162. Thereafter, oversheets 164 supplied from rolls are temporarily bonded to both surfaces of the center core 162, resultant laminate is cut into a predetermined form having an appropriate size, and the cut product is subjected to hot pressing. After the center core 162 and the oversheet 164 are bonded to each other to form a integral laminate, the resultant laminate is punched into a card form having a predetermined size, and is subjected to embossing and desired writing by means of an embossing encoder.

In the process according to the above-mentioned embodiment, the card 1 is produced from a center core 2 in the form of a sheet which has been produced from a substrate 2a in the form of a sheet. However, at the present invention is not restricted to such a process. More specifically, a continuous sheet supplied from a roll thereof may also be used as the material constituting the center core.

Figure 11:
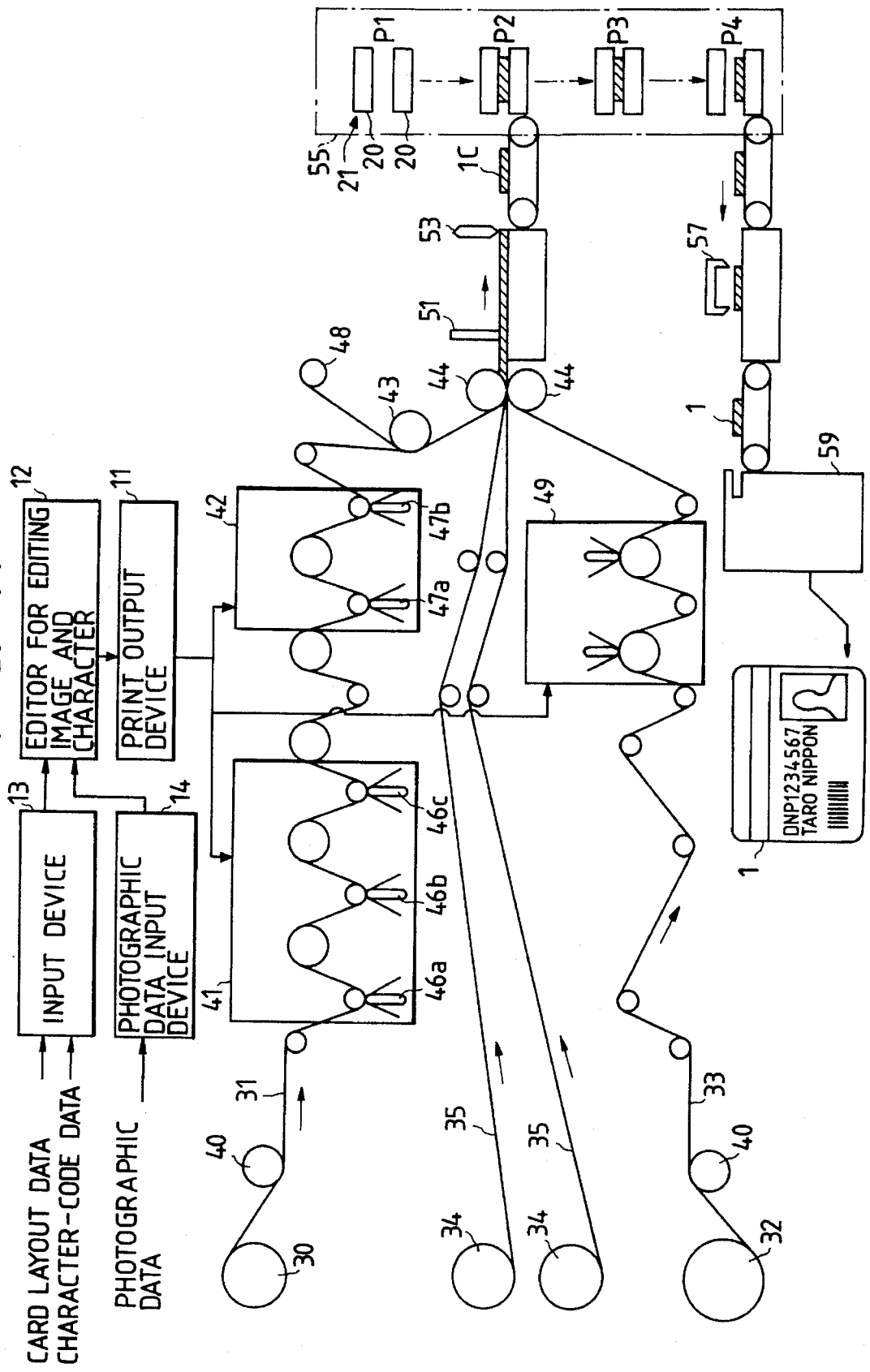
FIG. 11 is a schematic view for illustrating a production line for practicing a process for producing a card according to another embodiment of the present invention.

FIG. 11 shows such an embodiment, and schematically shows a line wherein cards are continuously produced from a plurality of rolls comprising polyvinyl chloride sheet. In this embodiment, however, the center core comprises a laminate of a plurality of thin sheets.

Referring to FIG. 11, reference numeral 30 denotes a roll from which a transparent polyvinyl chloride sheet 31, for an oversheet to be disposed on the card surface side is to be supplied, reference numeral 32 denotes a roll from which a transparent polyvinyl chloride sheet 33 for an oversheet to be disposed on the card back surface side is to be supplied, and reference numeral 34 denotes a roll from which a transparent polyvinyl chloride sheet 35 for a center core of the card is to be supplied. The polyvinyl chloride sheet 35 wound up in the roll 34 for the center core has been provided with printed image such as explanation and design common to all cards in advance by using an offset printing machine, a screen printing machine, etc., and has been coated with a bonding agent required for the bonding. In this figure, two polyvinyl chloride sheets 35 are shown, but the number of such sheets may be increased, as desired.

Along the conveying path for the polyvinyl chloride sheet 31 for the oversheet to be disposed on the surface side of the card, there are disposed: a surface roller 40, a sublimation type thermal transfer printer 41, a melting type thermal transfer printer 42, a magnetic strips transferring roller 43, etc. Downstream of the roller 43, there is disposed a superposing roller.

The sublimation type thermal transfer printer 41 is one for recording a color facial photograph and comprises three thermal heads 46a, 46b and 46c respectively corresponding to yellow, magenta and cyan colors.

The melting type thermal transfer printer 42 is one for recording a character and a bar code, and comprises two thermal head 47a and 47b respectively corresponding to recording of these images.

Similarly as in the embodiment as shown in FIG. 2, to these printers 41 and 42, there are connected: a print output device 11, an editor 12 for editing image and character, an input device 13 for inputting card layout data and character-code data, and a photographic data input device (CCD camera, CCD scanner, etc.) 14, etc. In such a variable data recording means, when an operator inputs variable data such as card layout data and character-code data by using the input device 13, and inputs variable data such as facial photograph by using the photographic data input device 14, the image-character editor 12 lays out the variable data in a predetermined position, the facial photograph may be recorded by means of the sublimation type thermal transfer printer, and the character and bar code may be recorded by means of the melting type thermal transfer printer. The magnetic stripe transfer roller 43 is one for transferring the magnetic stripe supplied from a magnetic stripe roll 48 to the surface of the polyvinyl chloride sheet.

Along the conveying path for the oversheet to be disposed on the back surface of the card, a surface roller 40 and a melting type thermal transfer printer 49 are also disposed. The melting type thermal transfer roller 49 is also controlled by the print output device 11.

Downstream of the superposing roller, there are disposed a temporary bonding hot stamper 51 for temporarily bonding the laminated sheet, a outting device 53, a hot pressing device 55 for bonding, an automatic punching device 57, an embossing encoder 59, etc.

The hot pressing device 55 is one shown in FIG. 7(C), wherein a number of pressing portions comprising a pair of press plates 20 are supported on a turret. When the turret is rotated, the pressing portion 21 passes the positions P1 to P4 as shown in FIG. 11. Herein, the position P2 is a position for receiving and hot-pressing the temporarily bonded product, the position P3 is a position for cooling and pressing, and the position P4 is a position for release and discharge.

Next, there is described a process for producing a card according to the above-mentioned production line.

A polyvinyl chloride sheet 31 for card surface is supplied from a roll 30, and the surface thereof is smoothed by means of the surface roller 40. On the back surface (i.e., a surface capable of contacting the center core) of the sheet 31, a facial photograph is continuously recorded by means of a sublimation type thermal transfer printer 41. In this case, an alignment of a card in transverse direction may be either of single-line, or multi-line. A character and a bar code are recorded by means of the melting type thermal transfer printer 42, and thereafter a magnetic stripe is transferred by means of the magnetic stripe transfer roller 43.

Further, a polyvinyl chloride sheet 33 for the oversheet to be disposed on the card back surface is supplied from a roll 32, and the surface thereof is smoothed by means of the surface roller 40. On the back surface (i.e., a surface capable of contacting the center core) of the sheet 33, a character is recorded by means of a melting type thermal transfer printer 49.

These polyvinyl chloride sheets 31 and 33 are respectively superposed on the surface and back surface of the polyvinyl chloride sheet 35 supplied from the roll 34 of polyvinyl chloride sheet for the center core, by means of the superposing roller 44, the resultant laminate is subjected to temporary bonding by means of the hot stamper for temporary bonding, and out into a certain form having a predetermined size by means of the cutter 53. In this case, an alignment of a card in transverse direction and in longitudinal direction may be either of single-line or multi-line. Then, the thus cut temporarily bonded product 1c is conveyed to the hot pressing device 55, and subjected to heating and pressing, and cooling and pressing by means of the pressing plates 20 to be bonded to form an integral product.

Then, the resultant product is punched into a certain form having a predetermined size, subjected to embossing encoder 59 to form an embossed character 7 as shown in FIG. 8, predetermined data is written in the magnetic stripe.

According to the above-mentioned production process, the ID card, as shown in FIG. 8 may be produced continuously.

Figure 12:
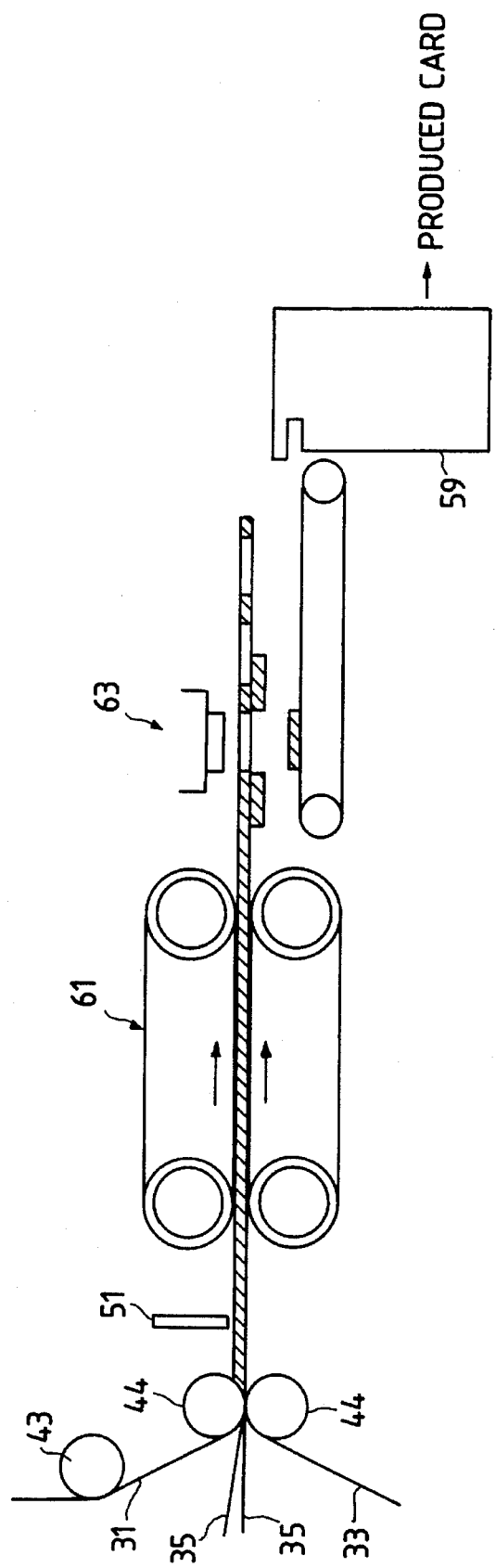
FIG. 12 is a schematic view for illustrating an embodiment obtained by modifying the embodiment shown in FIG. 11.

In the above-mentioned production process, a plurality of sheets are temporarily bonded to each other by means of the hot stamper 51, and thereafter the resultant laminate is cut into an appropriate size and hot-pressed. In the present invention, however, another process as shown in FIG. 12 may also be adopted. More specifically, in such a process, a temporarily bonded sheet is passed through a hot pressing device 61 to be heated and pressed in the former stage and to be cooled and pressed in the latter stage, so that an integrated bonded product is produced. Thereafter, the resultant product is punched into a predetermined size by means of a punching device 63 thereby to produce a card.

Further, a hologram or hiding layer may be transferred to the card before or after the embossing encoder 59, as desired.

In the embodiment as shown in FIG. 11, the variable data is recorded on the back surface of the oversheet. However, it is also possible to record the variable data on the surface or back surface, or both surface and back surface of the polyvinyl chloride sheet constituting the center core.

As described wherein above, according to the present invention, a conventional operation for bonding a photograph may be omitted, and the process for producing the card may be simplified, and automated. Further, the thus produced card according to the present invention is excellent in durability since the recorded surface thereof is covered with an oversheet.

Further, in an embodiment as shown in FIG. 11, wherein a plurality of sheets are supplied from rolls, desired variable data is recorded thereon in the course, and the resultant product is laminated. According to such an embodiment, the productivity for the card may be improved and the production cost thereof may be reduced.

What is claimed is:

1. A process for producing a card comprising:

recording variable data comprising photographic data on at least a surface of a card substrate to be used for the card by variable data recording means which comprises a sublimation thermal transfer device, while a thermal transfer sheet having an image-receiving layer is thermally transferred by the sublimation thermal transfer device onto said surface of said card substrate for the recording; said image-receiving layer of the thermal transfer sheet is disposed on said substrate by the medium of a releasing layer comprising a graft copolymer containing a releasing segment;

superposing the card substrate and an oversheet in a sheet form supplied from a roll thereof to form an integral laminate; and cutting the integral laminate into a card form having a predetermined size.

2. A process according to claim 1, wherein the card substrate comprises a continuous resin sheet.

3. A process according to claim 1, wherein the card substrate comprises a continuous resin sheet obtained by superposing a plurality of resin sheets supplied from rolls thereof for the formation of the card substrate.

4. A sublimation thermal transfer system comprising:

a card substrate;

an oversheet to be disposed on at least one surface of said card substrate;

a thermal transfer means comprising a thermal transfer sheet provided with a dye layer imparted with a releasability by a graft copolymer containing a releasing segment, with a releasing layer comprising a graft copolymer containing a releasing segment and with an image-receiving layer formed on the releasing layer; and an image-receiving means utilized in combination with the thermal transfer means so as to record variable data including a photographic data as a recorded portion formed on a surface of said card substrate.

* * * * *